United States Patent
Baron et al.

[15] 3,694,508
[45] Sept. 26, 1972

[54] PURIFICATION OF P-AMINOPHENOL
[72] Inventors: Frank A. Baron, Short Hills; Roland G. Benner, New Providence; Alan E. Weinberg, Verona, all of N.J.
[73] Assignee: Mallinckott Chemical Works, Lodi, N.J.
[22] Filed: Oct. 16, 1969
[21] Appl. No.: 867,082

[52] U.S. Cl. ................................................. 260/575
[51] Int. Cl. ..................................................... C07c 91/44
[58] Field of Search ..................................... 260/575

[56] References Cited

UNITED STATES PATENTS 2,013,394   9/1935   Tolstoouhov...............260/575
3,383,416   5/1968   Benner......................260/575

FOREIGN PATENTS OR APPLICATIONS 1,028,078   5/1966   Great Britain.............260/575

Primary Examiner—Joseph Rebold
Assistant Examiner—C. F. Warren
Attorney—Wenderoth, Lind & Ponack

[57] ABSTRACT

A process for the purification of crude p-aminophenol comprising admixing the crude p-aminophenol with a water-immiscible solvent which is substantially a non-solvent for p-aminophenol having a boiling point above 40°C. and a melting point below 50°C. and selected from the group consisting of esters or hydrocarbons, and mixtures thereof and subsequently separating purified p-aminophenol from said mixture.

4 Claims, No Drawings

PURIFICATION OF P-AMINOPHENOL

BACKGROUND OF THE INVENTION

The present invention relates to the purification of p-aminophenol. More specifically it provides a method by which crude p-aminophenol can be treated to obtain the purified material. Also, it provides a method for the purification of p-aminophenol obtained by reduction of nitrobenzene.

p-Aminophenol is a well known and highly useful industrial chemical. Principle uses for the material are as an intermediate in the production of dyestuffs and photographic chemicals and as an intermediate in the production of pharmaceuticals.

There are a number of well known methods for the production of p-aminophenol involving the reduction of nitrophenol. In regard to these prior processes there may be mentioned those disclosed in U.S. Pat. Nos. 2,198,249 and 2,765,342.

In U.S. Pat. No. 3,383,416, issued May 14, 1968, there is disclosed a particularly advantageous process for the catalytic hydrogenation of nitrobenzene in aqueous sulfuric acid. In accordance with the process of this patent, the reduction of the nitrobenzene is interrupted prior to completion. The interruption occurs at a time when the reaction product mixture contains a sufficient amount of unreacted nitrobenzene to form an immiscible layer of nitrobenzene containing a reaction catalyst suspended therein. A separate aqueous layer contains the p-aminophenol product as a salt. The aqueous layer is separated from the nitrobenzene layer and the p-aminophenol is isolated from the aqueous layer while the nitrobenzene layer is recycled to the hydrogenation zone.

A difficulty which is encountered in these catalytic hydrogenation processes is that the p-aminophenol is present in the crude reaction mixture along with numerous side products. Some of these side products such as non-phenolic amines, caustic insoluble substances, and the like, may interfere with the preparation of pure derivatives of p-aminophenol, e.g., N-acetyl p-aminophenol.

Among the interfering side products may be quinones, quinonimines, meriquinonimines, azoxybenzene, aniline, p-aminodiphenylamine, 4-hydroxy-4'-aminobiphenyl derivatives, indophenol derivatives, p-hydroxydiphenylamine, 4,4'-diaminodiphenylether and 4-(p-hydroxy anilino)-naphthoquinone-(1,2). Also present are oxidation and reduction derivatives of the above.

In certain cases, e.g., for many non-pharmaceutical uses, the p-aminophenol can be separated from the crude reaction medium with a sufficient degree of purity by simple precipitation from the reaction medium. For many other uses, however, as for example, for use as an intermediate in preparing N-acetyl p-aminophenol (Acetaminophen) meeting the National Formulary (N.F.) specifications, simple precipitation from the reaction medium is insufficient. This is the case since many of the side products and impurities are difficultly separable from the p-aminophenol.

It is thus advantageous to remove the deleterious side products and impurities which are present with the crude p-aminophenol and certain proposals have been made for accomplishing this. British Patent 1,028,078 proposes the washing, or extraction, of p-aminophenol with isopropanol or other aliphatic alcohols. This, however, fails to remove all classes of impurities. Likewise, the extraction of p-aminophenol from its impurities with a solvent, or solvents, followed by recovery of the p-aminophenol from the solvent fails to afford a sufficiently pure product and is also uneconomical. See U.S. Pat. No. 2,013,394.

According to the present invention, a method is provided whereby p-aminophenol may be purified in a relatively simple and inexpensive operation.

SUMMARY OF THE INVENTION

According to the present invention purified p-aminophenol is obtained by admixing crude p-aminophenol with an essentially water immiscible solvent which is substantially a non-solvent for p-aminophenol having a boiling point above 40°C. and a melting point below 50°C. and selected from the group consisting of esters or hydrocarbons, and mixtures thereof and subsequently separating purified p-aminophenol from the mixture.

According to a preferred embodiment of the invention the solvent is admixed with an aqueous solution of the crude p-aminophenol and the purified p-aminophenol precipitated and separated from the resulting multiphase mixture wherein the impurities are contained in the solvent phase.

According to another preferred embodiment of the invention, the aqueous solution of crude p-aminophenol is produced by the catalytic hydrogenation of nitrobenzene in aqueous sulfuric acid and, following admixture with the water immiscible solvent, the pH of the resulting mixture is adjusted to between about 6.5 and 7.5 to crystallize or precipitate the purified p-aminophenol which is then separated from the multiphase mixture, preferably by centrifuge.

DETAILED DESCRIPTION OF THE INVENTION

The present invention is predicated on the discovery that p-aminophenol may be simultaneously separated from its crude admixtures or solutions and purified in a single, efficient and inexpensive operation by employing certain organic solvents having well defined physical and chemical properties; particularly solubility characteristics with respect to p-aminophenol and the impurities normally associated therewith. More specifically, it has been found that p-aminophenol may be simultaneously purified and separated from its crude admixtures by contact with a certain class of solvents which are substantially non-solvents for p-aminophenol but which are solvents for substantially all of the impurities normally contained in crude p-aminophenol.

These solvents may be classified as substantially water-immiscible, organic compounds which are non-reactive with p-aminophenol having boiling points above about 40°C. and melting points below about 50°C. and selected from the group consisting of esters or hydrocarbons, and mixtures thereof. Generally, the solvents employed in the practice of the invention should have a solubility in water of less than 10 percent and, preferably, less than 5 percent at 30°C. Moreover, the solvents should also be capable of dissolving at least about 0.10 percent, preferably, at least 0.25 percent of its weight at the temperature employed of the impurities normally associated with crude p-aminophenol, namely, quinones, quinonimines, meriquinonimines, azoxybenzene, aniline, p-aminodiphenylamine, 4-hydroxy-4'-aminobiphenyl derivatives, indophenol derivatives, p-hydroxydiphenylamine, 4,4'-diaminodiphenylether, 4-( p-hydroxyaniline-napthoquinone-(1,2), and oxidation and reduction derivatives thereof.

Suitable solvents include the lower alkyl acetates such as those when the alkyl moiety contains two to eight carbon atoms, e.g., ethyl, butyl, isobutyl, sec. butyl, amyl, isoamyl, isopropyl, methyl amyl acetates; and benzene, toluene and the xylenes. Suitable xylenes include o-, m- and p-xylene as well as mixtures thereof. In particular commercially available mixed xylene can be employed.

The amount of solvent to be employed in the purification process will depend upon a variety of factors, e.g., the nature of the solvent, the temperature of the purification operation, the amount of impurities contained in the crude p-aminophenol, etc. Thus, the higher the overall temperature of the purification operation, the smaller the amount of solvent that will be required since the solvents have a higher solvating power at elevated temperatures. In addition, some of the contemplated solvents have a higher degree of solvating power for the impurities contained in crude p-aminophenol than other solvents. For example, the solubility of these impurities in toluene is slightly less than 0.25 percent at 30°C. whereas the solubility of these same impurities in butyl acetate is considerably greater than 0.25 percent at 30°C.

As noted above, the process of the invention is particularly adapted for the purification of crude p-aminophenol produced according to the method described in U.S. Pat. No. 3,383,416; i.e., the catalytic hydrogenation of nitrobenzene in aqueous sulfuric acid. Generally, such crude p-aminophenol fractions contain from 0.25 percent to 3.0 percent by weight of 4,4'-diaminodiphenyl ether. It has been found that when an amount of solvent is employed, when applying the process of the present invention to such crude p-aminophenol fractions, sufficient to remove up to 3 percent of 4,4'-diaminodiphenyl ether, a sufficient quantity of the remaining impurities are removed to result in the production of p-aminophenol which may be converted to NF grade acetyl aminophenol. In many instances, however, and in other applications, considerably less solvent is required. Generally, an amount of solvent in the range of from about 0.2 to about 10 parts by weight of solvent per part by weight of p-aminophenol are sufficient to enable the production of substantially pure p-aminophenol.

Although the above described solvents may be contacted with crude p-aminophenol in virtually any form to remove impurities therefrom, it is preferred to admix the solvent with an aqueous solution of the crude p-aminophenol, more preferably, the aqueous acidic solution obtained by the catalytic hydrogenation of nitrobenzene in aqueous sulfuric acid as described in U.S. Pat. No. 3,383,416. By contacting the solvent with an aqueous acidic solution of the crude p-aminophenol, it is possible to simultaneously purify and separate the p-aminophenol from its crude admixtures. This may be achieved by adjusting the pH of the aqueous mixture to between about 6.5 and 7.5 which results in a precipitation of the purified p-aminophenol which may then be readily filtered or centrifuged therefrom. Any inert alkaline agent, e.g., ammonia, calcium hydroxide, sodium hydroxide, etc., may be employed to adjust the pH of the mixture; however, it is preferred to employ ammonia due to economy and ease of handling.

At pH's below about 6.5, particularly below 6.2, some of the p-aminophenol is held in solution as a sulfuric acid salt and lost during the separation step. When employing a fixed alkali such as sodium hydroxide, it is preferred to avoid adjusting the pH to a level above 8.5 since some of the p-aminophenol will be converted to the water soluble-sodium salt and, hence, remains in solution.

A pH above 7.5 up to above 12 may be employed when utilizing ammonia, however, care must be taken to avoid exposure of the p-aminophenol to oxygen to avoid discoloration.

It is preferable to adjust the pH of the solution after the addition of solvent. However, the pH adjustment may be performed before the addition of solvent, but longer periods of contact between solvent and crystals are then required in order to extract all of the impurities. Solid p-aminophenol may be purified by first dissolving the solid in water and then carrying out the above described operation.

The purification of the p-aminophenol is enhanced by carrying out the contact between the crude p-aminophenol and the selective solvent at an elevated temperature. The elevated temperature during the mixing step enchances the dissolution of the impurities associated with the crude p-aminophenol in the organic solvent. Cooling the heated mixture following adjustment will result in the precipitation of additional quantities of para-aminophenol from the solution. The admixture of solvent and crude p-aminophenol may be heated to a temperature between room temperature, i.e., 25°C, and the reflux temperature of the mixture. Following adjustment of the pH, the mixture may conveniently be cooled to a temperature of about 30°C or below to precipitate the p-aminophenol.

Following separation of the purified p-aminophenol crystals, there remains a two-phase solvent-water mixture. The two layers may be separated according to conventional techniques. The aqueous layer may be recycled for recovery of p-aminophenol remaining therein. The organic solvent layer may be distilled to recover the solvent which may also be recycled to replenish the solvent in the extraction operation. The impurities recovered therefrom during the distillation step may be recovered and themselves purified for commercial use.

Following separation of the purified para-aminophenol, the p-aminophenol may be treated in accordance with conventional methods to stabilize the product.

For example, the p-aminophenol may then be washed with an aqueous solution of an oxidation stabilizer such as sodium bisulfite, sodium sulfite, etc.

The following examples are illustrative of the invention. In the examples, parts are by weight unless otherwise indicated. Parts by weight bear the same relationship to parts by volume as do grams to milliliters. Moreover, unless otherwise indicated, the p-aminophenol solutions employed in the examples are obtained by the catalytic hydrogenation of nitrobenzene in aqueous sulfuric acid as described in Example 1 of U.S. Pat. No. 3,383,416. The hydrogenation is interrupted prior to completion. In order to facilitate separation of the catalyst suspended in the unreacted nitrobenzene, additional nitrobenzene is added after which the lower organic layer of catalyst suspended in nitrobenzene is separated from the upper aqueous layer of p-aminophenol-containing solution. The upper aqueous layer is boiled to distil sufficient water to remove dissolved nitrobenzene and a nitrobenzene-free aqueous solution containing p-aminophenol is obtained. The solution contains up to about 9 percent by weight of p-aminophenol and up to 11–12 percent by weight of sulfuric acid.

EXAMPLE 1

Toluene (350 g.) is added to 1,800 g. of an aqueous solution of sulfuric acid containing approximately 9 percent p-aminophenol. The two phase mixture is agitated during neutralization with anhydrous ammonia to a pH of 7.0 to 7.2 at 80°C. After cooling to 65°C, the resulting crystals in the slurry are removed by filtration on a centrifuge and washed several times with 20 g. of toluene. The wet cake of crystals weighed 138 g. A loss-on-drying analysis indicated that this is equivalent to 125 g. of dry product.

The wet cake of p-aminophenol is added to 900 g. water and heated to 90°C. Sufficient sulfuric acid is added to dissolve all of the p-aminophenol after which it is decolorized with a trace of sodium hydrosulfite. Activated carbon (5 grams) is then added and the solution filtered at 90° to 95°C. After neutralization of pH 7.0 to 7.2 with ammonia, the aminophenol in the filtrate is acetylated by addition of 145 g. acetic anhydride while agitating at 40°C. While cooling the acetylation mixture of 15°C, white crystals of acetyl aminophenol precipitate. The crystals are isolated by filtration. After recrystallization from water, the acetyl aminophenol passes all of the National Formulary (N.F.) specifications for this product.

EXAMPLE 2

An aqueous solution of sulfuric acid (1,800 g.) containing approximately 9 percent aminophenol is neutralized as described in Example 1 except that the 350 g. of toluene is not added. After cooling and filtering the neutralized mixture, the crystals are washed several times with 20 g. of toluene as in Example 1. The wet crystals of p-aminophenol are then treated as in Example 1 and the resulting acetyl aminophenol isolated as in Example 1. The recrystallized product had a melting point of about 1°C lower than the product obtained in Example 1, and it failed the caustic solubility test of the N.F. specifications.

EXAMPLE 3 n-Butyl acetate (190 g.) is added to 1,800 g. of an aqueous solution of sulfuric acid containing approximately 9 percent p-aminophenol. The two-phase mixture is neutralized to pH 7.0 to 7.2 with ammonia and then cooled to 20° to 30°C. The resulting crystals of p-aminophenol are filtered on a centrifuge and washed several times with 20 g. n-butyl acetate. The wet filter cake of p-aminophenol weighed 173 g. (152 g. dry basis). One hundred and forty-two g. of the wet cake are acetylated and otherwise treated as described in Example 1. The resulting N-acetyl aminophenol passed all the N.F. specifications for this product.

EXAMPLE 4

54.5 g. (0.5M) crude dry purple p-aminophenol is dissolved in 5 percent aqueous sulfuric acid at 95°C, treated with 2 g. of activated carbon and 0.1 g sodium hydrosulfite and filtered. The hot filtrate is then stirred with 150 g. of isobutyl acetate (under reflux condenser) as aqueous ammonia was added to bring the pH up to 7.2. The resulting slurry is then cooled to 25°C, filtered and the filter-cake washed with 25 ml. of fresh isobutyl acetate, then with 25 ml. of 1 percent aqueous sodium bisulfite. After the filter cake is dried in a vacuum oven the resulting tan p-aminophenol is sufficiently pure for conversion of N.F. grade acetylaminophenol by the procedure described in Example 1.

EXAMPLE 5

190 g. of methyl amyl acetate is added to 1,800 g. of an aqueous solution of sulfuric acid containing approximately 9 percent p-aminophenol. The two-phase mixture is neutralized to pH 7.0 to 7.2 with ammonia and then cooled to 20° to 30°C. The resulting crystals of p-aminophenol are filtered on a centrifuge and washed several times with 20 g. of methyl amyl acetate. The wet filter cake of p-aminophenol weighed 173 g. (152 g. dry basis). One hundred and forty-two g. of the wet cake are acetylated and otherwise treated as described in Example 1. The resulting N-acetyl aminophenol passed all the N.F. specifications for this product.

EXAMPLE 6

One hundred and ninety g. of sec-butyl acetate is added to 1,800 g. of an aqueous solution of sulfuric acid containing approximately 9 percent p-aminophenol. The two-phase mixture is neutralized to pH 7.0 to 7.2 with ammonia and then cooled to 20° to 30°C. The resulting crystals of p-aminophenol are filtered on a centrifuge and washed several times with 20 g. of sec-butyl acetate. The wet filter cake of p-aminophenol weighed 173 g. (152 g. dry basis). One hundred and forty-two g. of the wet cake are acetylated and otherwise treated as described in Example 1. The resulting N-acetyl aminophenol passed all the N.F. specifications for this product.

EXAMPLE 7

One hundred and ninety g. of primary amyl acetate is added to 1,800 g. of an aqueous solution of sulfuric acid containing approximately 9 percent p-aminophenol. The two-phase mixture is neutralized to pH 7.0 to 7.2 with ammonia and then cooled to 20° to 30°C. The resulting crystals of p-aminophenol are filtered on a centrifuge and washed several times with 20 g. of primary amyl acetate. The wet filter cake of p-aminophenol weighed 173 g (152 g. dry basis). One hundred and forty-two g. of the wet cake are acetylated and otherwise treated as described in Example 1. The resulting N-acetyl aminophenol passed all the N.F. specifications for this product.

EXAMPLE 8

One hundred and ninety g. of ethyl acetate is added to 1,800 g. of an aqueous solution of sulfuric acid containing approximately 9 percent p-aminophenol. The two-phase mixture is neutralized to pH 7.0 to 7.2 with ammonia and then cooled to 20° to 30°C. The resulting crystals of p-aminophenol are filtered on a centrifuge and washed several times with 20 g. of ethyl acetate. The wet filter cake of p-aminophenol weighed 172 g. (152 g. dry basis). One hundred and forty-two g. of the wet cake are acetylated and otherwise treated as described in Example 1. The resulting N-acetyl aminophenol passed all the N.F. specifications for this product.

EXAMPLE 9

One hundred and ninety g. of propyl acetate is added to 1,800 g. of an aqueous solution of sulfuric acid containing approximately 9 percent p-aminophenol. The two-phase mixture is neutralized to pH 7.0 to 7.2 with ammonia and then cooled to 20° to 30°C. The resulting crystals of p-aminophenol are filtered on a centrifuge and washed several times with 20 g. of propyl acetate. The wet filter cake of p-aminophenol weighed 173 g (152 g. dry basis). One hundred and forty-two g. of the wet cake are acetylated and otherwise treated as described in Example 1. The resulting N-acetyl aminophenol passed all the N.F. specifications for this product.

What is claimed is:

1. A method for the purification of crude p-aminophenol prepared by the catalytic hydrogenation of nitrobenzene in aqueous sulfuric acid, consisting essentially of admixing at a temperature above 25°C an aqueous solution of the crude p-aminophenol with a member selected from the group consisting of lower alkyl acetates wherein the alkyl moiety contains from two to eight carbon atoms, as solvent to dissolve substantially all the impurities, adjusting the pH of the mixture to between 6.5 and 7.5, cooling the mixture to a temperature below 30°C. and separating the precipitated and purified p-aminophenol therefrom.

2. A method according to claim 1 wherein the amount of acetate present is from 0.2 to 10 parts by weight per part of p-aminophenol.

3. A method according to claim 1 wherein ammonia is employed to adjust the pH of said mixture.

4. A method according to claim 1 wherein said solvent is n-butyl acetate.

* * * * *

UNITED STATES PATENT OFFICE
CERTIFICATE OF CORRECTION

Patent No. 3,694,508            Dated September 26, 1972

Inventor(s) PURIFICATION OF P-AMINOPHENOL

It is certified that error appears in the above-identified patent and that said Letters Patent are hereby corrected as shown below:

In item [73] of the heading of the above-identified patent, change "Mallinckott Chemical Works, Lodi, N.J." to --Mallinckrodt Chemical Works, St. Louis, Mo.--.

Signed and sealed this 17th day of April 1973.

(SEAL)
Attest:

EDWARD M. FLETCHER, JR.           ROBERT GOTTSCHALK
Attesting Officer                 Commissioner of Patents